May 9, 1967     D. B. BROUGHTON     3,318,803
DISTILLATION DRYING PROCESS
Filed March 8, 1965
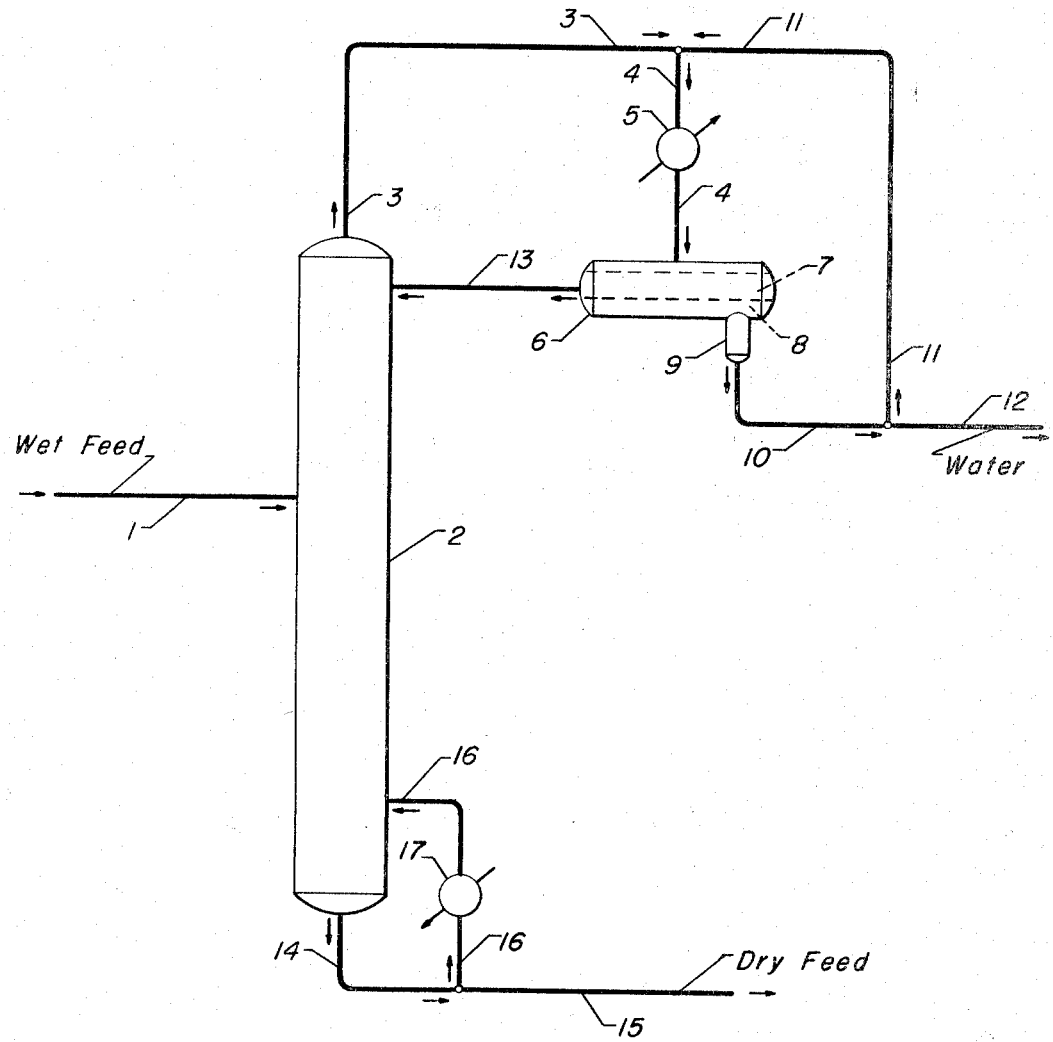
INVENTOR:
Donald B. Broughton
BY: James R. Hoatson Jr.
William H. Page II
ATTORNEYS United States Patent Office 3,318,803
Patented May 9, 1967

3,318,803
DISTILLATION DRYING PROCESS
Donald B. Broughton, Evanston, Ill., assignor to Universal Oil Products Company, Des Plaines, Ill., a corporation of Delaware
Filed Mar. 8, 1965, Ser. No. 437,778
6 Claims. (Cl. 208—187)

This invention relates to an improvement in the distillation drying of liquids at least partially immiscible with water. More specifically, this invention relates to the distillation drying of liquid hydrocarbons. Further, this invention relates to the use of excess liquid water when separating a hydrocarbon phase from a water phase to prevent the suspension of water microdroplets in the hydrocarbon phase.

In one of its embodiments, this invention relates to a process for drying a liquid feed which comprises the steps: introducing the wet feed into a fractionator column; withdrawing a vapor overhead stream from the fractionator; introducing a liquid water stream into contact with the overhead vapor stream and combining the resulting mixture; condensing the resulting mixture; introducing the combined mixture into a vessel and allowing the mixture to form a liquid wet feed phase and a liquid water phase; returning the liquid wet feed to the fractionator as reflux; recycling a portion of the liquid water phase into contact with said vapor overhead stream; withdrawing the remaining portion of the liquid water phase from the vessel; and withdrawing a liquid dry feed stream from the bottom of the fractionating column.

In distillation drying of hydrocarbons, generally a wet hydrocarbon is introduced into a fractionating column operated at conditions to drive the water and some of the feed overhead as a vapor. The vapor that leaves the overhead outlet of the fractionator contains an appreciable concentration of water vapor as much as even 5 or 10 mole percent. The overhead vapor stream is introduced into a condenser, wherein heat is extracted from the vapor stream. The condensed overhead stream is sent into a overhead receiver vessel where the stream separates into a wet hydrocarbon light phase and a hydrocarbon saturated dense aqueous phase. The lighter hydrocarbon phase is returned to the fractionation column as reflux. One of the problems with this system is that there is a tendency for microdroplets of liquid water to remain suspended in the hydrocarbon phase in the form of a cloudy mist. This mist exists in addition to the dissolved water and is not readily separatable from the hydrocarbon phase. When the hydrocarbon is returned to the fractionator as reflux, the mist droplets of liquid water are also returned to the fractionator which in turn makes the job of drying the feed more difficult and expensive.

It is an object of this invention to reduce the amount of aqueous mist formation in the feed phase when condensing a feed at least partially immiscible in water and water thereby forming a feed phase and an aqueous phase.

It is another object of this invention to prevent the return of aqueous microdroplets in the liquid reflux in a distillation drying process.

It is a more specific object of this invention to separate a hydrocarbon phase from an aqueous phase while minimizing the aqueous mist formation in the hyrocarbon phase.

It is another more specific object of this invention to recycle liquid water to the overhead vapor stream before condensing said stream in a distillation drying process.

These and other objects will become more apparent in light of the following detailed description.

The accompanying figure is a typical distillation drying process. The wet feed flowing in flow conduit 1 is introduced into fractionator 2. The fractionator contains internal members to promote gas-liquid contact such as bubble cap trays, sieve decks, packing such as Raschig rings, etc. An overhead vapor stream is removed from fractionator 2 through flow conduit 3 where it contacts liquid water flowing in flow conduit 11 and the resulting mixture flows through flow conduit 4. The mixture passes through condenser 5 where sufficient heat is extracted therefrom to condense all the normally liquid material. The condensed mixture flows through flow conduit 4 and into overhead receiver 6. The mixture separates into a less dense feed phase 7 and a more dense aqueous phase 8. The less dense feed phase is withdrawn from receiver 6 through flow conduit 13 and returns to fractionator 2 as reflux. The more dense aqueous phase is withdrawn through boot 9 attached to receiver 6 and passes through flow conduit 10. A portion of the liquid aqueous phase is returned to flow conduit 4 through flow conduit 11 as recycled liquid while the remaining portion of the liquid aqueous phase is withdrawn through flow conduit 12. Dry liquid feed is withdrawn through the bottom of fractionator 2 through flow conduit 14 where a portion flows through flow conduit 16, reboiler heater 17 and returns to fractionator 2 by means of flow conduit 16. The remaining portion of the dry liquid feed is removed through flow conduit 15 and is the desired dry product of the process. The reboiler heater may be a thermosyphon type, a kettle type, a direct fired heater, etc.

The operating conditions such as pressure, temperature, etc. maintained in the fractionator are primarily a function of the feed to be dried. It is desirable to carry only a small amount of the feed overhead along with the water in order to avoid excessive energy consumption in heater 17 and condenser 5. The extent to which the feed is to be dried is also determinative in the selection of operating conditions. Suitable controls must be integrated with the fractionator shown in the drawing in order for the fractionator to function in a continuous manner. For example, a pressure controller, a top temperature controller, a level controller for withdrawing water out flow conduit 12, a controller for the heat input in reboiler 17 and a level controller for withdrawing dry feed out flow conduit 15 must be provided. The selection of this equipment and auxiliary means for actuating the controllers as well as pumps are omitted from the drawing in the interest of brevity and although its selection is within the ordinary skill of an instrumentation engineer, the equipment still must be provided.

The use of the recycled liquid water in flow conduit 11 serves to increase the ratio of concentration of water to feed in the overhead stream and when sufficient water is added the water phase becomes the predominant or continuous phase while the feed phase becomes the discontinuous phase. This concept is illustrated by a first run in which 70 cc. of benzene and 30 cc. of water are introduced into a 150 cc. flask. The contents of the flask are thoroughly agitated for 10 minutes whereupon the flask is allowed to stand for 1 hour. After the 1 hour period a cloudy benzene phase layer is observed on top of a water phase layer. This cloudy appearance is due to the misting or suspension of microdroplets of liquid water with the benzene phase. Under this condition the benzene is the predominant component and is termed the continuous phase. A second run is made in which 30 cc. of benzene and 70 cc. of water are introduced into a 150 cc. flask. The contents of the flask are again agitated and allowed to stand as in the first run. Again a benzene phase layer forms on top of the water phase layer but this time the benzene is clear and free of mist.

In this second run the water is the predominant component and is termed the continuous phase. It appears that the non-predominant component tends to mist into the continuous phase.

Distillation drying finds specific utility in drying various liquid streams. For example when hydrocarbons are to be introduced into a catalytic reactor wherein the catalyst is sensitive to water, the hydrocarbon must be thoroughly dried. Thus in the alkylation of benzene with ethylene to form ethyl benzene over a $BF_3$-alumina catalyst, the benzene must be thoroughly dried to preserve the activity of the catalyst. Another example is the necessity of drying a butane feed prior to charging to a butane isomerization reactor containing a catalyst such as $AlCl_3$, which is reactive with water. Another example is the necessity of drying propylene before charging to a dimerization reactor containing a potassium amide catalyst. Still another example of the necessity of distillation drying is the drying of LPG (containing $C_3$ and $C_4$ hydrocarbons) before selling for fuel consumption.

The following examples are included to further demonstrate the utility and operability of the present invention but it is not intended to limit the invention to the materials disclosed therein.

*Example I*

A fractionator is installed substantially as shown in the accompanying figure. Wet benzene containing about 500 p.p.m. of water is introduced into flow conduit 1 at a rate of 30 gallons per minute. Fractionator 2 is operated at a pressure of 3 p.s.i.g. and a top temperature of 180° F. Sufficient liquid water is recycled through flow conduit 11 to give a mole ratio of water to benzene in condenser 5 of about 3 to 1. Dry benzene containing less than 2 p.p.m. of water is withdrawn through flow conduit 15 at a rate of 30 gallons per minute. The reflux material flowing in flow conduit 13 is examined and is found to be clear indicating no entrained mist of suspended water microdroplets.

*Example II*

The run made in Example I is repeated except no liquid water is recycled through flow conduit 11. The reflux material flowing in flow conduit 13 is examined and is found to be cloudy indicating the presence of suspended water microdroplets. To achieve the same dryness of benzene it is necessary to increase the energy to heater 17 and to increase the cooling duty of condenser 5.

I claim as my invention:

1. In a process for the distillation drying of a wet liquid aromatic hydrocarbon feed at least partially immiscible with water in which said feed is charged to a fractionation column, a substantially dry feed stream is removed from the bottom of said column, a vapor stream comprising feed and water is removed overhead from said column, the vapor is at least partially condensed, the resulting condensate is separated into an aqueous phase and a non-aqueous phase conventionally containing microdroplets of liquid water suspended therein, at least a portion of said non-aqueous phase is returned to said column as reflux, and the aqueous phase is removed from the system, the improvement which comprises recycling a portion of said aqueous phase back into contact with said vapor stream before the latter is condensed, the quantity of said aqueous phase so recycled being at least sufficient, in relation to said non-aqueous phase, to substantially eliminate said water microdroplets from said non-aqueous phase.

2. The improvement of claim 1 further characterized in that said feed is a benzene hydrocarbon.

3. The improvement of claim 1 further characterized in that said feed is benzene.

4. In a process for the distillation drying of a wet liquid aromatic hydrocarbon feed at least partially immiscible with water in which said feed is charged to a fractionation column, a substantially dry hydrocarbon stream is removed from the bottom of said column, a vapor stream comprising hydrocarbon and water is removed overhead from said column, the vapor stream is totally condensed, the resulting condensate is separated into a two-phase liquid body consisting of an aqueous phase and a hydrocarbon phase conventionally containing microdroplets of liquid water suspended therein, the total portion of said hydrocarbon phase is returned to said column as reflux, and the aqueous phase is removed from the system, the improvement which comprises recycling a portion of said aqueous phase back into contact with said vapor stream before the latter is condensed, the quantity of said aqueous phase so recycled being at least sufficient, in relation to said totally refluxed hydrocarbon phase, to substantially eliminate said water microdroplets from said totally refluxed hydrocarbon phase.

5. The improvement of claim 4 further characterized in that said feed is a benzene hydrocarbon.

6. The improvement of claim 4 further characterized in that said feed is benzene.

References Cited by the Examiner

UNITED STATES PATENTS

| | | | |
|---|---|---|---|
| 1,802,090 | 4/1931 | Roberts | 208—187 |
| 2,368,497 | 1/1945 | Shipley et al. | 208—187 |
| 2,785,120 | 3/1957 | Metcalf | 208—187 |
| 2,786,802 | 3/1957 | Hanisian et al. | 208—187 |
| 2,853,157 | 9/1958 | Harper | 208—187 |
| 3,151,055 | 9/1964 | Muller | 208—187 |

DELBERT E. GANTZ, *Primary Examiner.*

H. LEVINE, R. H. SHUBERT, *Assistant Examiners.*